United States Patent [19]

Schwering et al.

[11] Patent Number: 5,382,366
[45] Date of Patent: Jan. 17, 1995

[54] RETARDATION INSTALLATION WITH COMPRESSED AIR-DIAPHRAGM PUMP AND STROKE COUNT DEVICE

[75] Inventors: Hans-Ulrich Schwering, Leonberg; Roland Schaich, Leutenbach, both of Germany

[73] Assignee: Guetling GmbH, Fellbach, Germany

[21] Appl. No.: 145,862

[22] Filed: Oct. 29, 1993

[30] Foreign Application Priority Data

Nov. 26, 1992 [DE] Germany .................... 4239748

[51] Int. Cl.⁶ .............................................. B01D 15/00
[52] U.S. Cl. .................................. 210/662; 210/670; 210/678; 210/98; 210/190; 210/269; 210/277; 205/99; 205/100
[58] Field of Search ............... 210/662, 670, 678, 98, 210/108, 269, 277, 190; 205/99, 100

[56] References Cited

U.S. PATENT DOCUMENTS

| | | | |
|---|---|---|---|
| 2,265,225 | 12/1941 | Clark | 210/662 |
| 2,617,766 | 11/1952 | Emmett et al. | 210/662 |
| 3,676,336 | 7/1972 | O'Brien et al. | 210/96.1 |
| 3,960,721 | 6/1976 | Heskett | 210/283 |
| 4,076,618 | 2/1978 | Zeblisky | 260/583 |
| 4,100,065 | 7/1978 | Etzel | 423/139 |
| 4,104,158 | 8/1978 | Davis | 210/139 |
| 4,666,856 | 5/1987 | Irgum et al. | 502/402 |
| 4,897,797 | 1/1990 | Free, Jr. et al. | 73/168 |
| 4,954,265 | 9/1990 | Greenberg et al. | 210/710 |
| 5,027,661 | 7/1991 | Desaulniers et al. | 73/861 |
| 5,069,779 | 12/1991 | Brown et al. | 210/96.1 |
| 5,178,746 | 1/1993 | Darnall et al. | 205/287 |
| 5,192,418 | 3/1993 | Hughes et al. | 205/100 |

FOREIGN PATENT DOCUMENTS

0458119 11/1991 European Pat. Off. .
3822953 1/1990 Germany .
4004191 8/1991 Germany .

OTHER PUBLICATIONS

K. Marquardt, Metalloberfläche 42 (1988) pp. 386, 387.
Prospect of Goema; System Goemapur A 1 (2-1986).
Prospect of German Carbone AG: Recopur System Eco-Tec A.P.U. Regenerierungs- und Umweltschutz-Anlagen für Metall-Beizen (1.89).
L. Hartinger, Handbuch der Abwasser- und Recyclingtechnik, Carl Hanser Publisher Munich Vienna, 1991, pp. 452–458.

*Primary Examiner*—Cynthia L. Nessler
*Attorney, Agent, or Firm*—Flynn, Thiel, Boutell & Tanis

[57] ABSTRACT

In a retardation installation having a container holding the adsorber material capable of accepting acid, in particular adsorber resin, and a feed for a watery acid-salt-solution, for example from an anodizing bath, a further feed for a regenerating solution to regenerate the adsorber material, in particular demineralized Water in opposite flow to the acid-salt-solution, as well as a drain for the treated acid-salt-solution which has passed the adsorber material and with at least one pump for the transport of the acid salt solution and/or the regenerating solution, precisely one pump is provided for which is configured as a compressed air-diaphragm pump and which exhibits a device for stroke counting as well as a device for the control of the volume flow of acid-salt-solution or regenerating solution on the a basis of the stroke count of the compressed air-diaphragm pump. By means of the stroke count it is possible to obtain a precise admeasurement of the critical amount of fluid up to an acid breakthrough or a dilution of the anodizing bath in consequence of the fluid introduced thereto by the regeneration of the adsorber resin.

6 Claims, 2 Drawing Sheets 5,382,366

RETARDATION INSTALLATION WITH COMPRESSED AIR-DIAPHRAGM PUMP AND STROKE COUNT DEVICE

BACKGROUND OF THE INVENTION

The invention concerns a retardation installation for acid-salt-separation with a container for holding the acid accepting adsorber material, in particular an adsorber resin, and exhibiting a feed for watery acid-salt-solution by way of example from an anodizing bath, a further feed for a regenerating solution to regenerate the adsorber material, in particular demineralized (DM) water, in reverse flow relative to the acid-salt-solution, as well as a drain for the treated acid-salt-solution which has passed the absorber material and with at least one pump for transporting the acid-salt-solution and/or the regenerating solution.

Such a retardation installation is by way of example known from L. Hartinger, Handbook of Waste Water and Recycling technology, Carl Hanser Publishing House, Munich/Vienna, 1991, pages 452 ff.

These types of retardation installation for the separation of acid-salt-solutions are, for example, utilized commercially in the recycling of anodizing baths. Towards this end the acid-salt-solution (as a rule a watery solution of sulphuric acid and aluminium sulphate) is pumped in the upwards stream into a container having pellets made from adsorber resin, which are capable of adsorbing, up to a certain saturation limit, the acid from the acid-salt-solution into their surfaces. The waste water which is drained out of the container from above is then largely free from the acid components.

As soon, however, as the saturation limit of the resin pellets is reached, a so-called acid breach takes place in the run-off from the container. This means that at this time acid-salt-solution from the anodizing bath emerges from the resin container which has not been deacidified or deacidified only to a marginal extent. In order to prevent such an acid breach it has only been possible to continuously measure the acid concentration of the fluid flowing out of the resin container so that the introduction of acid-salt-solution into the resin container could be stopped before a critical value were reached. This method is, however, awkward and difficult.

It is therefore usual in retardation installations to determine, prior to the begin of the normal operation that amount of volume flow of acid-salt-solution through a container having fresh active adsorber resin at which the adsorber resin is saturated with acid and beyond which an acid breach would result.

After a precise admeasuring of this empirically determined volume amount of acid-salt-solution into the freshly active adsorber resin and without further acid measurements of the waste water from the resin container, the adsorber resin is supplied with acid-salt-solution until just prior to the saturation point. Thereafter the feeding of acid-salt-solution into the resin container is stopped and, in the downstream direction, i.e. in the opposite direction to the upward-streaming acid-salt-solution in the resin container, a regenerating solution, in the case of anodizing baths, generally demineralized water or fresh water is introduced into the resin container from above. Due to the concentration gradient the regenerating solution takes in the acid stored in the adsorber resin pellets and transports it, after leaving the resin container, back into the anodizing bath. After the passing of a certain volume flow of regenerating solution through the adsorber resin, the resin is largely acid-free and newly activated.

If then additional regenerating solution were to be, without restraint, introduced in the downward stream through the resin container into the anodizing bath, the anodizing bath would at this point due to the addition of acid-weak or acid-free water be continuously diluted. Therefore, as is the case for the prevention of acid breach in the retardation installation, the volume amount of regenerating solution is measured to determine whether it has no longer removed sufficient amounts of acid from the adsorber resin. Upon reaching this second volume amount the regeneration procedure is stopped to thereby prevent an undesirable dilution of the anodizing bath.

In the upward as well as the downward streams both the empirically determined volume amounts of acid-salt-solution or regenerating solution which are introduced to the adsorber resin must each be precisely measured and maintained. Towards this end in known retardation installations admeasuring containers are usually provided for in which the corresponding fluid volumes are measured prior to transport to the resin container. These types of admeasuring containers are, however, expensive and require substantial amounts of space. Furthermore, the retardation method is thereby complicated in that the corresponding current streams are not directly fed into the resin container rather must first be measured in the admeasuring container.

A further disadvantage of the known retardation installations is that the mechanically driven positive-displacement pumps which are usually used to transport the liquid require special safety mechanisms to prevent over-heating and the generation of prohibitively high pressures in the conduit systems during malfunctions of valves. In the event of a malfunction it would otherwise be possible for the pump to overheat and to leak or, upon exceeding a maximum pressure level, to cause a conduit to rupture. Precisely due to the utilization, for example in anodizing baths, of concentrated acids it is absolutely necessary that such a spill-off of the system in the event of a malfunction be prevented.

It is therefore the purpose of the present invention to present a retardation installation of the above described kind with which on the one hand no breach measurement or monitoring of the composition of run-off regenerating solution is necessary while, on the other hand, no admeasuring container for the volume admeasurement of the fluid streams is necessary and which additionally, in the event of malfunction caused for example by the loss of compressed air, blockage of conduits due to dirt or the improper adjustment of valves, stops in a safe operative configuration so that no special safety precaution for the pump for transporting the volume flow is necessary.

SUMMARY OF THE INVENTION

This purpose is achieved in accordance with the invention in that exactly one pump is provided for, that the pump is configured as a compressed air-diaphragm pump exhibiting a device for stroke counting and that a device for the control of the volume flow of acid-salt-solution or regenerating solution based on the stroke count of the compressed air diaphragm pump is provided for.

Instead of the usual admeasuring of volume flows via admeasuring vessels it is now possible for the admeasurement to transpire on the basis of the number of strokes of the compressed air-diaphragm pump which is proportional to a certain volume amount. In this fashion the admeasurement problem is solved in an elegant and cost-effective fashion and the retardation installation in accordance with the invention is compact and occupies minimal space.

As is the case with the critical breach volume the stroke number which is needed up to the saturation point is also empirically determined only once before the beginning of operations. The volume amount of acid-salt-solution which is necessary to cause the acid breach of the resin container corresponds now to a certain number of strokes of the compressed air-diaphragm pump. In this manner as is the case with the conventional "admeasurement technique" via admeasuring vessels, a largely constant acid concentration in the acid-salt-solution flowing into the resin container is assumed, a condition however which normally obtains in industrial processes which require very uniform quality as is the case, for example, in the above mentioned anodizers.

In the event of a possible malfunction the retardation installation in accordance with the invention, with the compressed air-diaphragm pump, stops in an operative position which is safe for the system since the compressed air-diaphragm pump, in contrast to a positive-displacement pump with mechanical drive, does not overheat and also cannot produce an unacceptable overpressure in the conduit system which could lead to the rupturing of conduits.

In an embodiment of the retardation installation in accordance with the invention the device for stroke counting includes two alternately driven, preferentially electromechanical, counting mechanisms which each shut themselves off after a predetermined stroke count and switch-on the other counting mechanism. With the assistance or these two alternately driven counting mechanisms the corresponding stroke number and thereby the corresponding volume amount of the acid-salt-solution or regenerating solution feeding into the resin container is determined and admeasured asynchronously. The predetermined switchover point then corresponds to each of the empirically measured stroke counts for the corresponding fluid volume, each of which is initially measured once.

In a preferred embodiment of the invention the stroke count device includes a, preferably, electronic counting mechanism with at least two storable discrete stroke values. In this fashion it is possible to configure the retardation installation in a less expensive and more compact fashion whereby the at least two critical stroke values can, for example, be introduced into a microprocessor for controlling the volume flow of the liquids in the retardation installation.

In a particularly preferred embodiment the device for the control of the volume flow includes a plurality of control fluid valves as well as two relay valves for driving all the fluid valves. In contrast to the method known up to this time, with which each of the fluid valves was controlled by an individual control simulator, with this embodiment the driving of the fluid valves transpires solely by means of two relay valves. In this fashion, in the inventive retardation installation, the apparative expenditure and difficulties are still further reduced.

A method for the operation of a retardation installation of the above mentioned kind with which an admeasuring of an amount of volume flow of acid-salt-solution or regenerating solution guided through the adsorber material transpires on the basis of a counting of the strokes of the compressed air-diaphragm pump is also within the framework of the invention.

A variation of this method in accordance with the invention is preferred in which the fluid valves necessary for the control of the volume flow of acid-salt-solution or of regenerating solution through the adsorber material are each controlled by a single relay valve.

The invention is described and explained in greater detail below with reference to the embodiments represented in the drawing. The features which can be extracted from the description and the drawing can be used in other embodiments of the invention either individually or collectively in arbitrary combination.

DESCRIPTION OF THE PREFERRED EMBODIMENT

Figure 2:
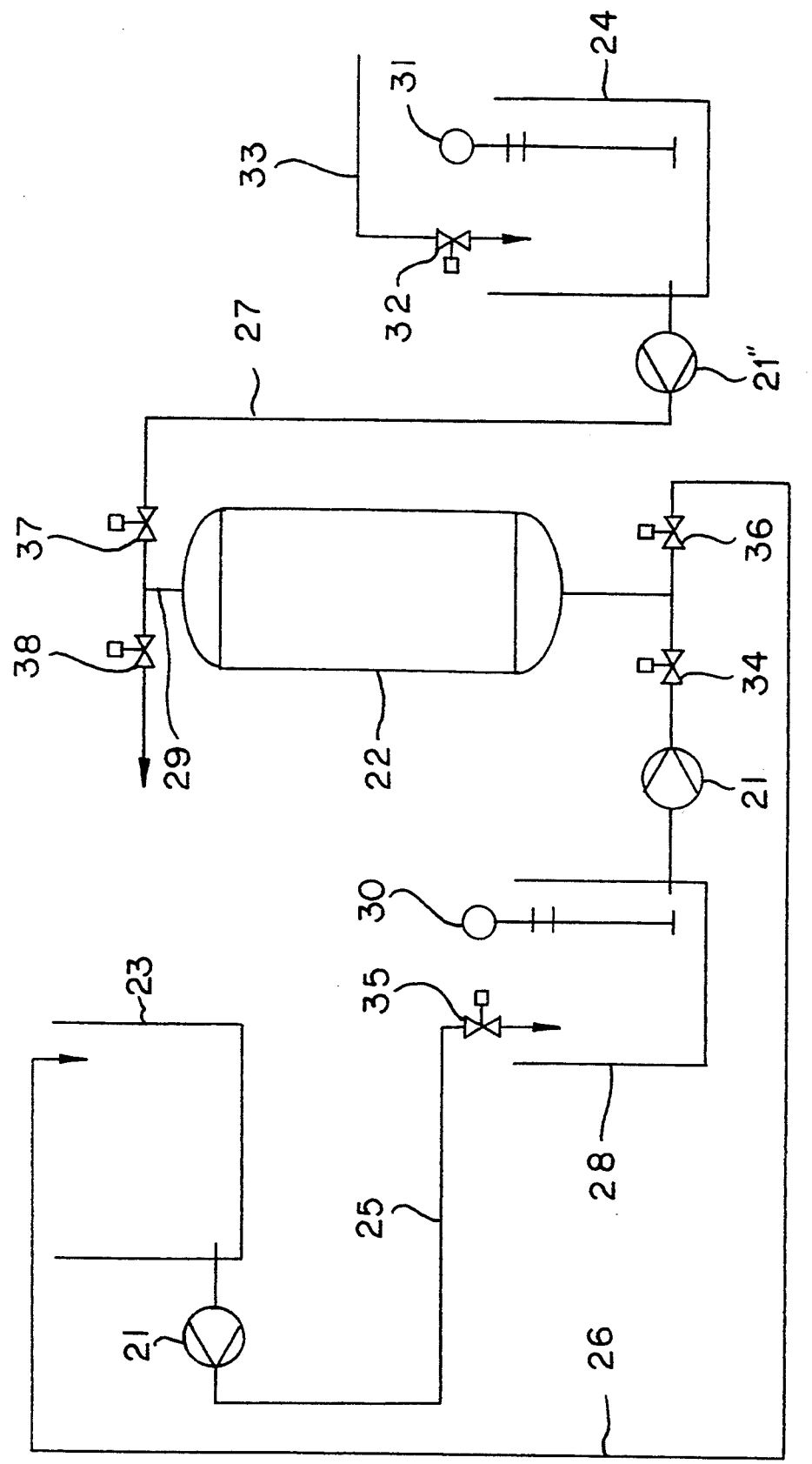
FIG. 2 shows a simplified functional schematic of an installation according to prior art.

In the schematically shown retardation installation for acid-salt-separation according to prior art of FIG. 2 an acid-salt-solution is pumped out of a container 23, for example an anodizing bath, via a conduit section 25 and a valve 35 with the assistance of a pump 21, which is usually a positive-displacement pump with mechanical drive, into a first admeasuring container 28. There with the assistance of a first fill-level measuring instrument 30 a first critical volume of acid-salt-solution, the so-called model amount, is measured. Subsequently the pump 21 is stopped and the valve 35 closed.

The acid-salt-solution model amount is then pumped by means of a pump 21' via an opened valve 34 from below in the upwards stream into a resin container 22 which contains an adsorber material capable of accepting acid, in particular, an adsorber resin in the form of small pellets. The adsorber resin in the resin container 22 removes, to a large extent, the acid from the acid-salt-solution so that the liquid leaving the resin container 22 through conduit section 21 is acid-free or at least has a very low acid level. Via an opened valve 38 the deacidified fluid reaches a waste water installation which is not shown where it is demineralized or otherwise postprocessed. During these steps the valves 36 and 37 are closed.

As soon as the adsorber resin in the resin container 22 is saturated with acid in such a fashion that it can no longer accept or only accept small amounts of acid from the acid-salt-solution, an acid breach takes place, e.g. a solution with large acid content would reach the waste water via the conduit section 29 and the valve 38. In order to prevent this the model volume amount of acid-salt-solution is measured exactly so that precisely the saturation limit of the adsorber resin is reached but not exceeded to prevent an acid breach. Towards this end it is necessary that the first critical volume be particularly exactly measured in the first admeasuring container 28.

After the model volume amount has passed through the resin container 22 and before reaching the acid breach point the valve 35, in response to a lower fill-level indicator of the fill-level measuring instrument 30, is closed and the pump 21' stopped. Meanwhile regenerating solution, usually fresh water or demineralized water, is pumped via a feed conduit 33 through a valve 32 into a second admeasuring container 24, whereby with the assistance of a second fill-level measuring instrument 31 a precisely determined volume of regenerating solution, the regenerating solution model amount, is measured out. Upon reaching the specific model amount the valve 32 is closed so that, at this time, precisely the second critical volume of regenerating solution is located in the admeasuring container 24.

A valve 37 in the conduit section 27 and a valve 36 in the conduit section 26 are then opened so that the model amount of regenerating solution is pumped, from above in reverse flow relative to the acid-salt-solution, out of the second admeasuring container 24 by means of a pump 21″ via the conduit sections 27 and 29 through the resin container 22. The regenerating solution removes, due to the gradient difference, a large fraction of the acid bound in the adsorber pellets and transports this through the opened valve 36 and the conduit section 26 into the container 23. In this fashion the previously removed acid is returned to the bath located in the container 23.

Even with this procedure only a certain critical amount of regenerating solution can be transported through the resin container 22 since after a certain time the acid adsorbed by the resin pellets is washed out of the adsorber material and the further addition of regeneration solution would dilute the bath in the container 23. This fact is on the other hand taken into consideration through the previous exact admeasurement of the model amount of regenerating solution in the second admeasuring container 24 since the second critical volume corresponds exactly to the experimentally determined amount of regenerating solution the transport of which through the adsorber resin initially saturated with acid does not yet lead to an undesired dilution of the bath in the container 23.

After the passage of the thereby determined model amount of regenerating solution through the resin container 22 and before reaching the second critical point, the valves 37 and 36, in response to a lower fill level indicator of the fill level measuring instrument 31, are closed, the pump 21″ is stopped, the pump 21′ is started again and the valves 35 and 38 are opened again in order to transport the newly admeasured model amount of acid-salt-solution, which is meanwhile in the first admeasuring container 28, through the resin container 22 and to initate the next deacidification step in the operation cycle.

Thereby it is tacitly assumed that the acid content in container 23 remains largely constant which in practice is normally always the case due to the necessity for consistent conditions.

Figure 1:
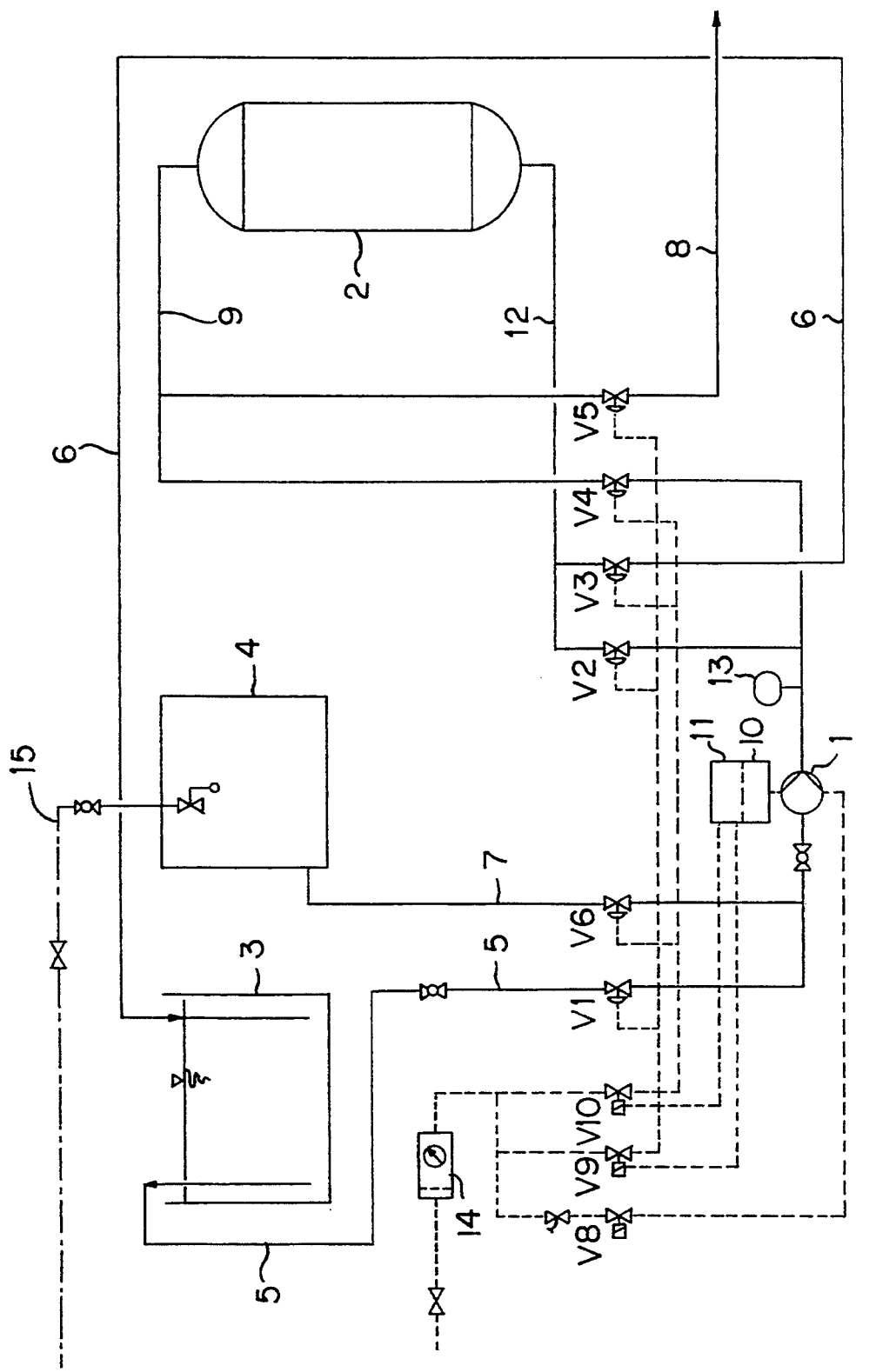
FIG. 1 shows a functional schematic of the retardation installation according to the invention.

In order to eliminate the time comsuming step of admeasuring the corresponding proper critical amount as well as to eliminate the space required for the admeasuring vessels 24, 28, in the retardation installation according to the invention as it is shown in FIG. 1 instead of the usual mechanical positive displacement pumps 21, 21′, 21″, only one compressed air-diaphragm pump 1 is used to transport the process fluids. Thereby the number of strokes of the compressed air-diaphragm pump 1 is measured with the assistance of a device 10 for stroke counting and the stroke count is correlated to a certain transport amount of fluid so that, based on the measured stroke count, the corresponding critical fluid amount can be relatively precisely observed.

In the embodiment of FIG. 1, the two relay valves V9 and V10 are, via a device 11 which is connected to the device 10 for stroke counting, controlled with the assistance of the signal cables represented by the dotted lines. The relay valves V9 and V10, which are fed via compressed air feed 14 drive, via the compressed air conduits shown as dashed lines, the pneumatically controlled fluid valves V1 through V6 which then control the fluid flow in the inventive retardation installation.

In a conduit section before the compressed air-diaphragm pump 1 an instrument for measuring the flow amount flow 13 is additionally provided for which can be utilized for the determination of the current fluid flow. The compressed air-diaphragm pump 1 is likewise driven with the assistance of compressed air feed 14, whereby a further relay valve V8 is provided for the control of the pump air pressure.

The operation cycle of the retardation installation in accordance with the invention shown in FIG. 1 corresponds largely to that of the prior art installation of FIG. 2:

By means of the compressed air-diaphragm pump 1, acid salt solution is pumped out of a container 3, filled for example with anodizing bath, via a conduit section 5 with fluid valve V1 open through the opened fluid valve V2 into a conduit section 12 and from there upstream through a resin container 2 filled with adsorbing material, whereby the two fluid valves V3 and V4 are closed. The deacidified solution exits the resin container 2 at its upper end through the conduit section 9 and flows through the open fluid valve V5 and conduit section 8 of a waste water installation not shown in the drawing.

Upon reaching the critical stroke count value and thereby the critical volume amount of acid-salt-solution which would lead to an acid breakthrough, on the basis of the pulses given by the stroke count device 10 to the control device 11 via the corresponding relay valve V9 control cables, the system is brought into an operational state such that the fluid valves served by this relay valve, V1, V2 and V5 are closed. Simultaneously the relay valve V10 is brought into such an operational state that the fluid valves V6, V3 and V4 which it serves are opened. In this fashion a further transport of acid-salt-solution out of the container 3 is interrupted while at this time a regenerating solution, generally demineralized water inlet through feed 15, is pumped out of a regenerating agent container 4 via a conduit section 7 and the opened fluid valve V6, with the assistance of a compressed air diaphragm pump 1 which continues to pump in the same direction, through the open valve V4 into the conduit section 9 and from there downstream through the resin container 2 with the adsorber pellets which are, at this point in time, saturated with acid.

The acid which is removed from the adsorber material by the regenerating solution is introduced via the conduit section 12 and the now opened fluid valve V3 to a conduit section 6 and by means of this to the container 3 with the anodizing bath.

Upon reaching the second critical stroke value, which indicates an imminent dilution of the anodizing bath, the relay valve 10, via the stroke count device 10 and the control device 11, is brought into an operational state with which the fluid valves V6, V3 and V4 which it serves are closed, whereas the relay valve V9 is brought into an operational state with which the fluid valves V1, V2 and V5 are opened so that acid-salt-solution is then guided out of the container 3 upstream to the resin container 2, in which the adsorber resin pellets are now again activated to receive acid.

The stroke count device 10 which must output two different critical stroke values to the control device 11 can in principle be constructed from two alternately operated, preferentially electromechanical, counting mechanisms which each switch-off after a preset stroke count, namely the corresponding critical stroke count, and then switch-on the other counting mechanism. In another embodiment the stroke count device 10 includes a preferentially electronic counting mechanism with at least two discrete storable stroke values so that the two critical stroke values can likewise again be relayed to the control device 11.

In the retardation installation according to the invention, special safety precautions are not necessary to prevent the compressed air-diaphragm pump 1 from overheating or from producing overpressure in the event of a malfunction which for example could be caused by loss of compressed air, conduit stoppage due to dirt or improper adjustment of valves. When the valves are closed the compressed air-diaphragm pump 1 produces, namely, no additional overpressure rather simply stops so that an overheating of the compressed air diaphragm pump 1 can also not occur.

We claim:

1. In an retardation installation for acid-salt separation with a container having an acid-receiving adsorber material, a feed for watery acid-salt-solution, an additional feed for a regenerating solution to regenerate, by means of a regenerating flow directed oppositely to a flow of the acid-salt-solution, the adsorber material, a drain for draining the acid-salt-solution which has passed through the adsorber material, and a pump to transport at least one of the acid-salt-solution and the regenerating solution, the improvement wherein exactly one pump is provided for and the pump is configured as a compressed air-diaphragm pump, the improvement further comprising a stroke count device connected to the pump and a device for controlling a volume flow of at least one of the acid-salt-solution and the regenerating solution based on a stroke count of the compressed air-diaphragm pump.

2. The retardation installation of claim 1, wherein the stroke count device includes two electromechanical counting mechanisms each of which is adapted to shut itself off after a designated stroke count and to switch-on the other counting mechanism.

3. The retardation installation of claim 1, wherein the stroke count device includes an electronic counting mechanism with at least two storable discrete stroke count values.

4. The retardation installation of claim 1, wherein the device for controlling the volume flow includes a plurality of controllable fluid valves and two relay valves for controlling all of the fluid valves.

5. A method for operating a retardation installation for acid-salt separation, the retardation installation comprising a container having an acid-receiving adsorber material, a feed for watery acid-salt-solution, an additional feed for a regenerating solution to regenerate the adsorber material by means of a regenerating flow directed oppositely to a flow of the acid-salt-solution, a drain for draining the acid-salt-solution which has passed through the adsorber material, a single compressed air diaphragm pump for transporting at least one of the acid-salt-solution and the regenerating solution, a stroke count device connected to the compressed air diaphragm pump, and a device for controlling a volume flow of at least one of the acid-salt-solution and the regenerating solution based on a stroke count of the compressed air diaphragm pump, said method comprising controlling the volume flow of at least one of the acid-salt-solution and the regenerating solution by counting the stroke count of the compressed air diaphragm pump.

6. A method for operating a retardation installation for acid-salt separation, the retardation installation comprising a container having an acid-receiving adsorber material, a feed for watery acid-salt-solution, an additional feed for a regenerating solution to regenerate the adsorber material by means of a regenerating flow directed oppositely to a flow of the acid-salt-solution, a drain for draining the acid-salt-solution which has passed through the adsorber material, a single compressed air diaphragm pump for transporting at least one of the acid-salt-solution and the regenerating solution, a stroke count device connected to the compressed air diaphragm pump, and a device for controlling a volume flow of at least one of the acid-salt-solution and the regenerating solution based on a stroke count of the compressed air diaphragm pump, wherein the device for controlling the volume flow includes a plurality of controllable fluid valves and two relay valves for controlling all of the fluid valves, said method comprising controlling the volume flow of at least one of the acid-salt-solution and the regenerating solution by counting the stroke count of the compressed air diaphragm pump, and controlling each of the fluid valves by means of a single relay valve.

* * * * *